United States Patent
Raymond et al.

Patent Number: 6,144,209
Date of Patent: Nov. 7, 2000

[54] FLUID DETECTION CABLE

[75] Inventors: Donald A. Raymond; Donald M. Raymond, both of Ft. Collins, Colo.

[73] Assignee: Raymond & Lae Engineering, Inc., Ft. Collins, Colo.

[21] Appl. No.: 09/283,442

[22] Filed: Apr. 1, 1999

Related U.S. Application Data

[60] Provisional application No. 60/080,955, Apr. 7, 1998.

[51] Int. Cl.[7] ............................. G01R 31/08; G01M 3/16
[52] U.S. Cl. ..................... 324/512; 73/40.5 R; 174/11 R
[58] Field of Search ................................. 324/512, 525, 324/533, 534, 539, 543; 73/40, 40.5 R; 174/11 R, 47; 340/603, 604, 605

[56] References Cited

U.S. PATENT DOCUMENTS

| | | | |
|---|---|---|---|
| 3,981,181 | 9/1976 | Ochiai | .................................. 73/40.5 R |
| 4,570,477 | 2/1986 | Sugibuchi | .............................. 73/40.5 R |
| 5,381,097 | 1/1995 | Takatori et al. | ........................ 324/512 |

*Primary Examiner*—Diep N. Do
*Attorney, Agent, or Firm*—Dean P. Edmundson

[57] ABSTRACT

An elongated fluid detection cable is described for use in detecting the presence of fluid (e.g. water) in areas where fluid is not desired. The cable includes a non-conductive base and at least two conductive members (such as wires). The base is twisted about its longitudinal axis, and the two conductive members are protected from touching conductive surfaces. The cable is connected to a control system which will activate an alarm when fluid contacts the conductive members of the cable. In one system, the cable includes four conductive members.

12 Claims, 2 Drawing Sheets

FLUID DETECTION CABLE

CROSS-REFERENCE TO RELATED APPLICATION

This application is based upon, and claims priority from, our provisional application, Ser. No. 60/080,955, filed Apr. 7, 1998.

FIELD OF THE INVENTION

This invention relates to apparatus used in the detection of conductive fluids. More particularly, this invention relates to the use of an elongated cable to detect the presence of conductive fluids.

BACKGROUND OF THE INVENTION

Leaks of fluids can occur in a commercial, industrial or residential environment. Fluid leaks are a problem and early detection can save significant expense and inconvenience. There are many ways to detect moisture, water or fluids and, in fact, many patents for devices or methods of detecting water, fluids or moisture have been previously issued. See, for example, U.S. Pat. No. 4,797,621 (Anderson et al.), U.S. Pat. No. 4,855,706 (Hauptly), and U.S. Pat. No. 4,910,998 (Willis et al.), incorporated herein by reference.

Several types of systems that provide water detection are:
1. Spot detection: An alarm is activated when fluid touches the sensor on the detector.
2. Continuous cable detection: An alarm is activated when fluid touches any part of the cable.
3. Continuous cable detection with indication: An alarm is activated when fluid has been detected, and it visually displays the distance from the control system to the leak.

Spot Detection

Leak detection in the past was usually associated with piping, air-conditioners, chillers, cooling towers, and hot water heaters and tanks since these are the areas most likely to have plumbing leaks or overflow of drains.

Leak detection protection provided by a spot detector is a relatively inexpensive way to detect leaks. Most systems are a single point, spot detector, with two electrodes on a substrate (board), anchored to the floor. 24 VAC is used to activate a relay in the unit when current flows between the electrodes. Other systems used a resistor from the anode to the gate of an SCR that causes the SCR to fire when sufficient conduction has been detected between the posts of the device and remained on until the electrodes were no longer in the fluid. The biggest problem with the non-SCR type is that if one of the electrodes became grounded, the power supply would short out with catastrophic results.

Some less expensive types of spot detectors include the swelling sponge type, which physically close a contact when fluid causes the sponge to swell. The sponge has to be replaced after each occurrence of fluid being detected.

Spot detectors are very good at detecting leaks around devices especially if a dam has been constructed around the unit, otherwise all low points in the floor must be covered to ensure that fluid does not flow by the sensor undetected.

Continuous Cable Systems

Some leak detection systems use a detection cable system. The cable usually is routed around the perimeter of the unit and when a conductive material touches it at any point, the circuit is completed and the alarm sounds. This type of system makes the construction of a dam unnecessary. These devices are usually unreliable, from a false alarm point of view, during high humidity conditions, which exist in the discharge air of most air conditioners from time to time. Some systems also depend upon the air conditioner being on to detect a leak and if it is not operating for some reason, the ability for it to detect a leak is gone. These types of systems do not lend themselves to protecting areas which are far removed from the general area around the air conditioner. Cables under the floor, in high humidity conditions for long periods of time, tend to corrode and, in some instances, conductive polymers have been applied to such wires to prevent this corrosion. Even these polymers can become contaminated if left in water, while the system is in alarm, for a long period of time.

The cable can become damaged under the raised floor and may have to be removed to be repaired. This cable can also become contaminated with various chemicals and other fluids found under the raised floor. Installation and reinstallation of these cables can be expensive, especially if they have been routed over the entire floor area where a considerable number of power and data cables may be laid on top of the water sensing cable. It may also be necessary to shut down the computer to accomplish this task.

Continuous Cable with Indication

This system is similar to the one above except that the control system of the leak detection system has a visual readout that displays the distance in feet from the control system to the fluid that was detected. A system that has been properly installed and has a floor plan will allow the user to pinpoint where the system has detected a leak.

This type of system could interface with a computer and the length would be translated into an analog signal that would then be displayed on a CRT screen to show the location of the leak. The same problems exist with this system as exist with the continuous cable system discussed above.

Two technologies exist for these types of systems: resistance readings and Time Delay Reflectrometry (TDR). The TDR tends to be more expensive than the resistance reading systems. They do have one advantage under ideal conditions, i.e. they can read and record multiple leaks on the same cable. There are, however, some conditions under which the second location cannot be detected and that is if the first leak is large enough to keep the signal from reaching the end of the cable and returning to the control system. This type of cable is expensive to manufacture.

All of the foregoing cable systems have similar problems and these are:
1. Center core cables tend to form a "set" and therefore they attempt to return to their original configuration if they are not restrained sufficiently. This makes installation difficult and time consuming. These cables also tend to be expensive.
2. Flat cables with silk or polymer fibers that have wires embedded in the interior of the cable are difficult to install, as they will not curve due to their construction. In addition, they are difficult to dry out once fluids are in the cable.
3. Cables held together with a weave of monofilament fibers are difficult to dry once they have become wet. In addition, moisture tends to be trapped in the fibers and can produce an accuracy problem in distance systems.

There has not heretofore been provided a simple, efficient and reliable cable system for detecting a fluid on a surface (such as a floor, or a pipe, etc.) having the features and advantages provided by the present invention.

SUMMARY OF THE PRESENT INVENTION

In accordance with the present invention there is provided a fluid detection cable which eliminates the problems associated with prior technologies. In addition, the manufacturing costs are lower, resulting in a less expensive system to the customer.

In one embodiment the fluid detection cable of the invention comprises at least two elongated conductive members (e.g., wires) each of which has a known electrical resistance and is coated along its length with a non-conductive water-insoluble, liquid pervious coating, wherein the conductive members or wires are twisted around a non-conductive, flexible base member. The base member has opposite side edges, and each of the edges includes a groove or recess for receiving one of the conductive members or wires.

In another embodiment, the new cable system of this invention is composed of two elongated metal members (e.g. wires) positioned within an extruded polymer base member to provide either CL2 or CL2P rating for conductors as specified by the National Electrical Code, Section 645. Two additional elongated metal members are also included along opposite side edges of the base member, each metal member covered with a water-insoluble, liquid pervious coating or sheath to protect the metal members and to protect them from shorting out in the event that either or both of them touch a conductive surface. If desired, the coating or sheath may comprise a braided monofilament covering.

The size of the finished cable is preferably approximately 0.25 inch (6.1 mm) in diameter or less, but larger diameter cables could also be made (e.g. 0.5 inch, 1 inch, etc.). The cable can be constructed in a variety of colors.

Other features of the fluid detection cable of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

The fluid detection cables of this invention utilize at least two elongated conductive members 1 and 4 and an elongated non-conductive flexible base member 2 having two opposite side edges with grooves or recessed areas 8 for receiving the two elongated conductive members. The two conductive members are coated along their length with a non-conductive water-insoluble liquid pervious coating 3. Then the base member is twisted so as to provide a cable illustrated in FIG. 4.

The cable can be laid out on a floor or other desired surface where it will lay flat and will therefore be able to detect fluid leaks reliably. If desired, the cable may be clipped to the necessary surface (e.g. with plastic clips), or it may be secured to an adhesive holder with a tie-wrap, or it can be secured to the underside of a pipe with a band, or pulled through a pipe that is a secondary containment, etc.

Figure 1:
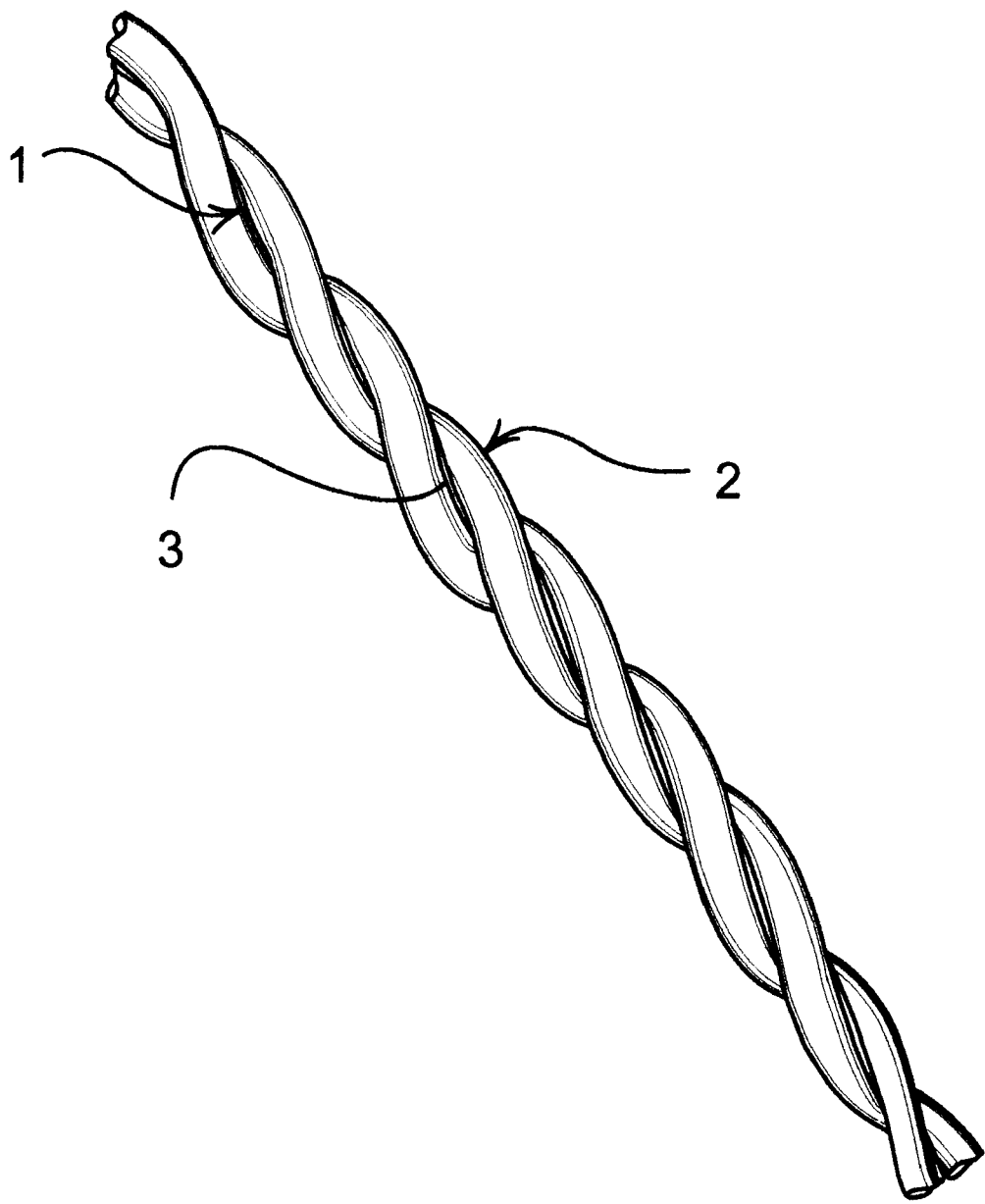
FIG. 1 is a perspective view of one embodiment of fluid detection cable of the invention.
Figure 2:
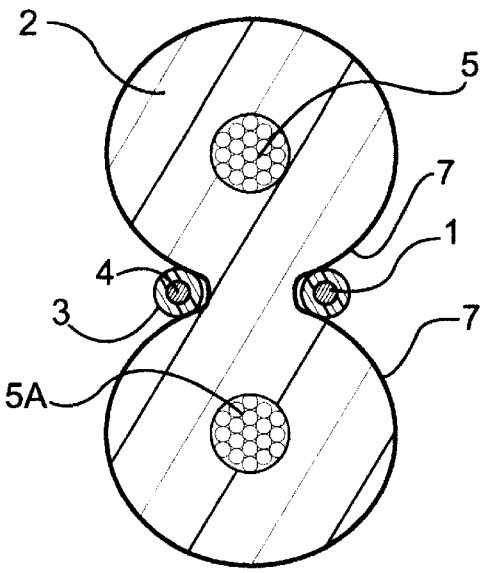
FIG. 2 is a cross-sectional view of the cable shown in FIG. 1.

Another embodiment of fluid detection cable of the invention is shown in FIGS. 1 and 2. In this embodiment there are elongated conductive members 5 and 5A embedded or disposed within the base member 2. The base member is composed of a non-conductive flexible polymer which is extruded to provide an elongated base having a generally figure-8 cross-section, as illustrated. The base member includes recessed areas or grooves 7 (defined by opposing convex surfaces) extending along opposite side edges of the base.

The conductive members 1 and 4 are positioned respectively in the recessed areas 7 on opposite side edges of the base member. The depth of each recessed area 7 is greater than the diameter of each conductive member 1 and 4 so that these conductive members do not touch any possibly conductive objects when the cable is positioned on a surface to detect fluid leaks.

Figure 3A:
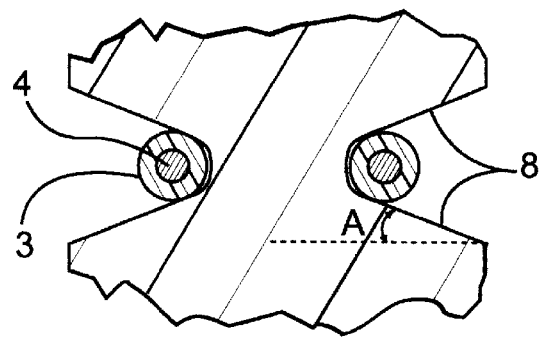
FIGS. 3 and 3A are cross-sectional views of another embodiment of fluid detection cable of the invention.

In the embodiment shown in FIGS. 1 and 2, the opposite sides of each recessed area 7 comprise convex surfaces of the base member. In the embodiment shown in FIGS. 3 and 4, the opposite sides of each recessed area 8 comprise flat surfaces which define an acute angle between them. Preferably, each flat surface defines an angle A with a horizontal plane extending transversely through the base member (as illustrated in FIG. 3A). The angle A is preferably in the range of about 10 to 12 degrees.

Figure 3:
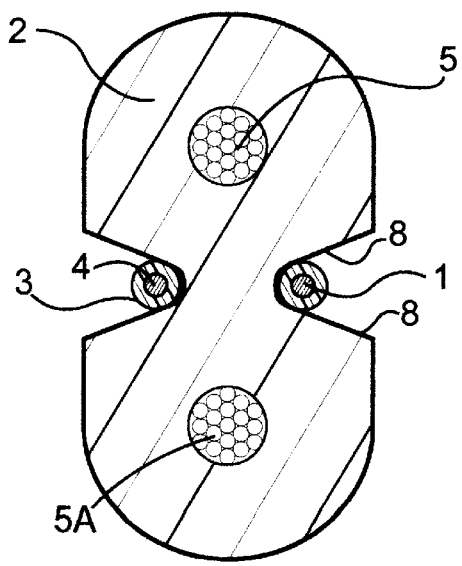
Figure 4:
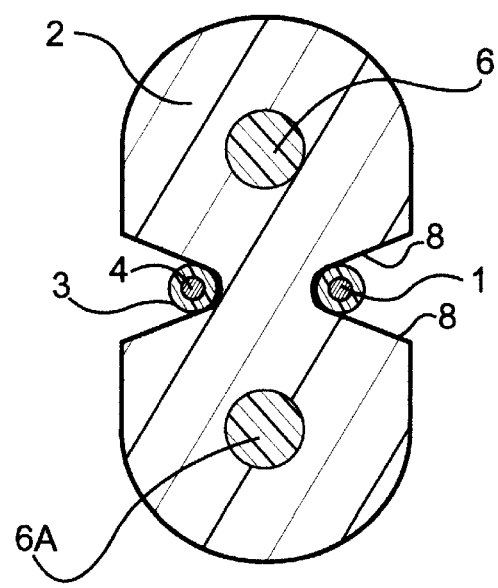
FIG. 4 is a cross-sectional view of another embodiment of the invention.

When the cable is intended for use in detecting a liquid which has a viscosity that approaches water, then the recessed areas preferably have the shape shown in FIGS. 3 and 4. When the cable is used to detect liquid which has a viscosity which is about 30% or less than that of water, the recessed areas will have the shape shown in FIG. 2.

The base member is twisted around its longitudinal axis after the conductive members 1 and 4 have been placed in the recessed areas on the sides of the base member. Tension on the base member and the number of revolutions of twist per foot contribute to producing a cable that has equal lengths of the conductive members 1 and 4. The number of revolutions per foot is usually in the range of about 5 to 20, and preferably is 10 to 14.

The cable shown in FIG. 4 includes only two conductive members, which are labeled 1 and 4. When the base member 2 is extruded, elongated non-conductive fillers 6 and 6A are used for mechanical reasons (i.e. to draw or pull the base member away from the extrusion die).

In another embodiment of the invention, the cable may include three conductive members. This would include conductive members 1 and 4 and either conductive member 5 or 5A. The operation of the cable to detect fluid is the same as when using only the two conductive members 1 and 4. The purpose of the member 5 or 5A is to indicate whether the cable has been severed or cut through at some point.

The cable can be used in any desired location. The area where the cable is used preferably is dry and free of dust.

The control system used in conjunction with the cable may be, for example, a DC wheat-stone bridge circuit to determine the direct voltage drop across the conductive members 1 and 4 at the point of contact. Alternatively, one may use a constant DC current sensing system and measure the drop of voltage at the point of contact. Control systems are available from Liebert Corporation (Model LDS1000 or LDS750), or Tracetek (Model TTM100 or TTM-1), for example. The cable can be used on control systems which use 1 Hz alternating AC signal that determines the voltage differential between the standard wave form when compared with the wave form which is returned when a parallel resistance path is generated when the liquid touches the conductive members 1 and 4 (RLE Technologies, Model WS2500).

When using the cable of FIG. 4 (with only two conductive members), one can detect when a fluid has contacted the cable (but cannot determine the exact location of the fluid). When the cable of FIGS. 1–3 is used, one can determine exactly where the fluid is contacting the cable because the electrical resistance of the conductive members 1 and 4 is known.

Other variants are possible without departing from the scope of this invention.

What is claimed is:

1. An elongated fluid detection cable comprising:
   (a) a non-conductive flexible base member having opposite side edges, wherein each said side edge includes a longitudinal recessed area extending along the length of said base member;
   (b) first and second elongated conductive members each of which has known electrical resistance and each of which is coated along its length with a non-conductive water-insoluble liquid pervious coating; wherein said conductive members are positioned respectively in one of said recessed areas in said base member;
   wherein said base member is twisted about its longitudinal axis.

2. A fluid detection cable in accordance with claim 1, wherein said cable has a diameter less than about 0.25 inch.

3. A fluid detection cable in accordance with claim 1, wherein said coating on each said conductive member has a thickness less than about 0.04 inch.

4. A fluid detection cable in accordance with claim 1, wherein said base member has a figure-8 cross-section.

5. A fluid detection cable in accordance with claim 1, further comprising a third elongated conductive member positioned within said base member and extending through the length of said base member.

6. A fluid detection cable in accordance with claim 1, wherein said first and second conductive members are separated by at least 0.01 inch.

7. A fluid detection cable in accordance with claim 1, wherein each said recessed area is defined by opposing convex sides.

8. A fluid detection cable in accordance with claim 1, wherein each said recessed area is defined by opposing flat sides forming an acute angle therebetween.

9. A fluid detection cable in accordance with claim 1, further comprising a fourth elongated conductive member positioned within said base member and extending through the length of said base member.

10. A fluid detection cable in accordance with claim 1 wherein said base member is twisted about its longitudinal axis about 10 to 14 revolutions.

11. A fluid detection cable in accordance with claim 1, wherein said coating comprises a braided monofilament covering.

12. An elongated fluid detection cable comprising:
    (a) a non-conductive flexible base member having opposite side edges, wherein each said side edge includes a longitudinal recessed area extending along the length of said base member;
    (b) first and second elongated conductive members each of which has known electrical resistance and each of which is coated along its length with a conductive water-insoluble polymer; wherein said conductive members are positioned respectively in one of said recessed areas in said base member;
    wherein said base member is twisted about its longitudinal axis.

* * * * *